(12) United States Patent
Kimura

(10) Patent No.: US 6,413,629 B1
(45) Date of Patent: Jul. 2, 2002

(54) EASY ADHESION FILM FOR TRANSPARENT CONDUCTIVE THIN FILM

(75) Inventor: Yoshihisa Kimura, Urawa (JP)

(73) Assignee: Kimoto Co., Ltd. (JP)

( * ) Notice: Subject to any disclaimer, the term of this patent is extended or adjusted under 35 U.S.C. 154(b) by 0 days.

(21) Appl. No.: 09/515,095

(22) Filed: Feb. 29, 2000

(30) Foreign Application Priority Data

Mar. 1, 1999 (JP) ............................................. 11-052519

(51) Int. Cl.$^7$ .............................. C08F 2/46; B32B 5/16; B32B 15/04; B32B 7/12
(52) U.S. Cl. ................ 428/343; 428/327; 428/355 AC; 428/523; 428/345; 428/355 EN; 428/355 R; 522/70; 522/74; 522/80; 522/96; 522/104; 522/116; 522/111; 522/109; 522/121; 522/120; 522/110; 526/201; 526/202; 526/203; 526/273
(58) Field of Search .................. 522/120, 121, 522/116, 96, 104, 74, 79, 80, 110, 111; 525/328; 428/35 SAC, 343, 345, 355 EN, 355 R, 327, 523; 526/202, 201, 203, 273

(56) References Cited

U.S. PATENT DOCUMENTS

| | | | | |
|---|---|---|---|---|
| 4,180,619 A | * | 12/1979 | Makhlouf et al. | 523/202 |
| 4,181,752 A | * | 1/1980 | Martens et al. | 427/54.1 |
| 4,556,595 A | * | 12/1985 | Ochi | 428/143 |
| 4,748,061 A | * | 5/1988 | Vesley | 428/40 |
| H509 H | * | 8/1988 | Choa | 526/264 |
| 4,885,170 A | * | 12/1989 | Darvell et al. | 428/40 |
| 5,735,362 A | * | 4/1998 | Kawase et al. | 428/327 |

\* cited by examiner

*Primary Examiner*—James J. Seidleck
*Assistant Examiner*—Sanza L McClendon
(74) *Attorney, Agent, or Firm*—Lorusso & Loud

(57) ABSTRACT

An easy adhesion film for a transparent conductive thin film comprises a transparent polymer film and an easy adhesion layer formed on the transparent polymer film, wherein the easy adhesion layer comprises at least an ionizing radiation curable resin binder, a (meth)acrylate copolymer binder and polymethyl methacrylate resin particles. The easy adhesion film has high durability, transparency and anti-Newton ring property when provided with a transparent conductive thin film.

14 Claims, 1 Drawing Sheet

EASY ADHESION FILM FOR TRANSPARENT CONDUCTIVE THIN FILM

BACKGROUND OF THE INVENTION

1. Field of the Invention

The present invention relates to an easy adhesion film used as a base film for a transparent conductive film suitably utilized for a touch panel, etc. In particular, it relates to an easy adhesion film capable of improving the durability in terms adhesive property, for instance, of a transparent conductive thin film made of indium tin oxide or the like to the base film.

2. Related Art

In recent years, liquid crystal displays have come into the spotlight as image display devices. They are seen to have high potential for application to portable electronic notebooks, information terminals and so forth. As input devices for portable electronic notebooks, information terminals and so forth, transparent touch panels overlaid on a liquid crystal display element, especially resistance-film-type touch panels, are widely used because of their low cost and so forth.

The resistance-film-type touch panel generally consists of a transparent conductive film and a glass plate overlaid with a transparent conductive thin film disposed across an appropriate gap. The transparent conductive films are generally produced by forming a transparent conductive thin film of indium tin oxide (hereinafter referred to as ITO) or the like on a transparent polymer film.

The transparent polymer film used for a transparent conductive film has a large number of fine irregularities (unevenness) on its surface. The irregularities are formed by embossing so as to have a certain range of arithmetical mean deviation and maximum height in order to prevent occurrence of Newton rings when the touch panel is touched (pressed)(Japanese Unexamined Patent Publication No.08-077871 (1996)).

A transparent conductive film using such a transparent polymer film as a substrate can not produce sufficient adhesion between the transparent polymer film and the transparent conductive thin film. This leads to poor durability, for instance peeling or abrasion, of the transparent conductive thin film when used for the touch panel.

Therefore, an object of the present invention is to provide a film having sufficient durability when provided with a transparent conductive thin film and suitable for forming a transparent conductive thin film having transparency and anti-Newton ring property.

DISCLOSURE OF THE INVENTION

The inventors conducted an extensive study to achieve the above-mentioned object. As a result, they found that an easy adhesion film for a transparent conductive thin film having all of the desired properties, such as adhesion with a transparent conductive thin film, transparency and anti-Newton ring property can be obtained by providing on a transparent polymer film a resin layer comprising a specified resin binder and resin particles admixed with an ionizing radiation curable resin binder.

An easy adhesion film for a transparent conductive thin film of the present invention comprises a transparent polymer film and an easy adhesion layer formed on the transparent polymer film, wherein the easy adhesion layer comprises at least an ionizing radiation curable resin binder, a (meth) acrylate copolymer binder and polymethyl methacrylate resin particles.

According to the present invention, an easy adhesion film for a transparent conductive thin film having high durability can be provided. In addition, transparency and anti-Newton ring property can be obtained when provided with a transparent conductive thin film.

A transparent conductive film is usually thermally shrunk by heat treatment called annealing in order to prevent shrinkage after assembly into a touch panel. During this annealing process, oligomer precipitation from a transparent polymer film becomes a problem because it causes degradation of transparency. The easy adhesion film for a transparent conductive thin film of the present invention does not suffer from such degradation of transparency.

DESCRIPTION OF THE PREFERRED EMBODIMENT

Figure 1:
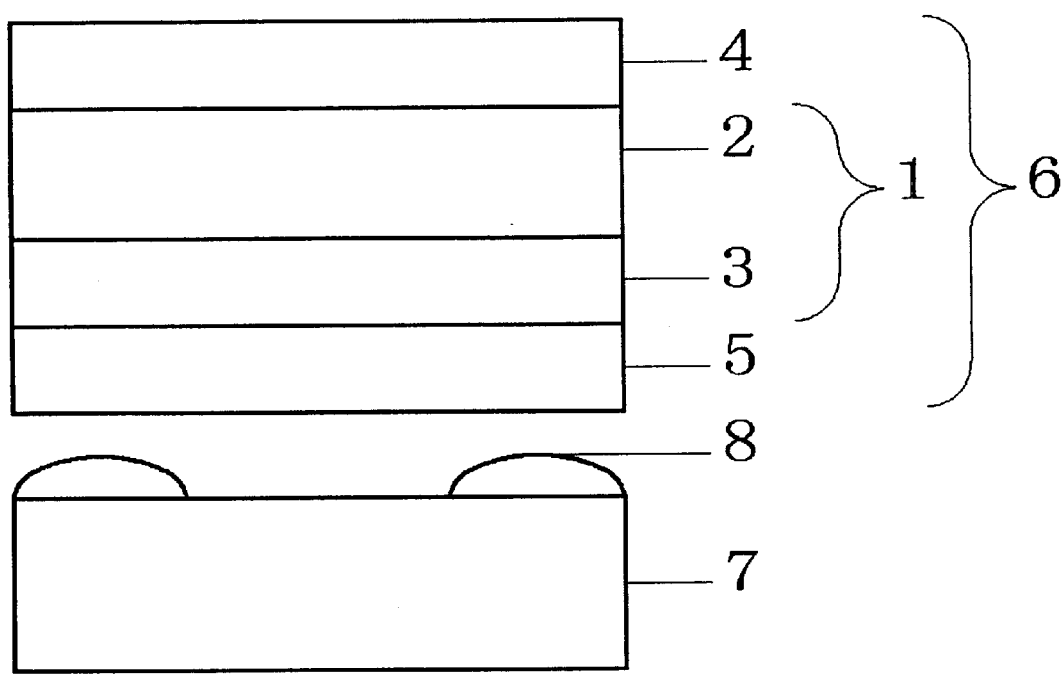
FIG. 1 is a sectional view showing an example of a touch panel using an easy adhesion film for a transparent conductive thin film of the present invention.

An easy adhesion film for a transparent conductive thin film 1 of the present invention will be explained in more detail hereinafter.

The easy adhesion film for a transparent conductive thin film 1 of the present invention consists of an easy adhesion layer 3 formed on a transparent polymer film 2. The easy adhesion layer 3 comprises at least an ionizing radiation curable resin binder, a (meth) acrylate copolymer binder and polymethyl methacrylate resin particles.

As the transparent polymer film 2, polyethylene terephthalate, polybutylene terephthalate, polycarbonate, polypropylene, polyethylene, acrylic, acetyl cellulose, vinyl chloride, etc. can be used because they do not inhibit transparency. A stretched film, in particular a biaxially stretched one, is preferred because mechanical strength and dimensional stability are improved. The thickness of the film may be selected depending on the used material. In general, however, it is 25 to 500 $\mu$m, preferably 50 to 200 $\mu$m.

The easy adhesion layer 3 of the present invention formed on the transparent polymer film 2 has excellent abrasion resistance and adhesion to a transparent conductive thin film 5 made of ITO or the like. It therefore improves the durability of the transparent conductive thin film 5 and prevents occurrence of Newton rings, which are problematic when a transparent conductive film 6 obtained from the transparent conductive thin film 5 is used for a touch panel, etc.

The easy adhesion layer 3 may be formed by, for example, coating a composition comprising an ionizing radiation curable resin and a (meth) acrylic acid copolymer as main binder, and polymethyl methacrylate resin particles mixed therein.

A photopolymerizable prepolymer, which can be cross-linked and cured by exposure to ionizing radiation (ultraviolet ray or electron beam), can be used as an ionizing radiation curable resin binder. Acrylic prepolymers, which have two or more acryloyl groups per molecule and provide a three-dimensional network structure when cross-linked and cured, are particularly preferred as the photopolymerizable prepolymer. Acrylic prepolymers include urethane acrylate, polyester acrylate, epoxy acrylate, melamine acrylate and so forth.

The ionizing radiation curable resin binder imparts abrasion resistance to the easy adhesion layer 3 and provides anti-Newton ring property together with transparency when mixed with polymethyl methacrylate resin particles described later.

The ionizing radiation curable resin binder is included in the easy adhesion layer 3 preferably in an amount of 70 to 97% by weight, more preferably, 75 to 95% by weight, of total amount of all binder ingredients constituting the easy adhesion layer 3. With an amount not more than 97% by weight, adhesion between the easy adhesion film 3 and the transparent conductive thin film 5 is not degraded. With an amount not less than 70% by weight, sufficient abrasion resistance of the easy adhesion layer 3 can be obtained and anti-Newton ring property is obtained in the easy adhesion layer 3 together with sufficient transparency when mixed with polymethyl methacrylate resin particles.

As the (meth) acrylate copolymer binder, an ordinary copolymer, graft or block copolymer of a monomer such as methyl (meth) acrylate, n-butyl (meth)acrylate, ethyl (meth) acrylate, 2-hydroxyethyl (meth) acrylate, 2-dimethylaminoethyl (meth) crylate, hydroxypropyl (meth) acrylate, hydroxybutyl (meth) acrylate or the like may be used.

The (meth) acrylate copolymer binder imparts the easy adhesion layer 3 with adhesion property with respect to the transparent conductive thin film 5.

The (meth) acrylate copolymer binder is included in the easy adhesion layer 3 preferably in an amount of 3 to 30% by weight, more preferably 5 to 25% by weight, of total amount of all binder ingredients constituting the easy adhesion layer 3. With an amount not less than 3% by weight, sufficient adhesion is obtained between the easy adhesion layer 3 and the transparent conductive thin film 5. With an amount not more than 30% by weight, the abrasion resistance of the easy adhesion layer 3 is not degraded.

Other thermoplastic or thermosetting resins may be added as binder ingredients so long as adhesion with the transparent conductive thin film 5, abrasion resistance, transparency and so forth are not inhibited.

Polymethyl methacrylate resin particles impart anti-Newton ring property and transparency to the easy adhesion layer 3 when mixed with the abovementioned binders. Spherical particles are preferably used. Although the average particle diameter should be selected depending on the thickness of the easy adhesion layer 3, it is preferably 1.0 to 30.0 μm. Considering heat resistance, solvent resistance and so forth, particles cross-linked with divynilbenzene or the like are preferably used for the particles.

The mixing ratio of polymethyl methacrylate resin particles relative to total amount of all binder ingredients constituting the easy adhesion layer 3 is preferably 0.01 to 0.5% by weight, more preferably, 0.1 to 0.3% by weight. With an amount not less than 0.01% by weight, sufficient anti-Newton ring property is imparted to the easy adhesion layer 3. With an amount not more than 0.5% by weight, sufficient transparency is imparted to the easy adhesion layer 3.

In the easy adhesion layer 3 of the present invention, unique corrugated irregularities are formed on the surface of a coated layer of an ionizing radiation curable resin containing particles by using an ionizing radiation curable resin as main binder and mixing with polymethyl methacrylate resin particles. Since the irregularities can be formed with a small amount of particles, this leads to high transparency of the film together with excellent anti-Newton ring property. In addition, since the refractive index of the (meth)acrylic acid copolymer binder, which improves adhesion between the easy adhesion layer 3 and the transparent conductive thin film 5, is almost equivalent to that of polymethyl methacrylate resin particles, i.e. 1.49, degradation of transparency due to irregular reflection caused by difference of refractive indexes can be prevented.

The easy adhesion layer 3 may contain a photopolymerizable monomer, a photopolymerization initiator, an ultraviolet sensitizer, a leveling agent, a solvent, etc., so long as properties such as adhesion between the easy adhesion layer 3 and the transparent conductive thin film 5, abrasion resistance, anti-Newton ring property and so forth are not degraded. The easy adhesion layer 3 may be formed by preparing a coating solution including the aforementioned additives as required and applying it to the transparent polymer film 2 by a known coating method.

The ionizing radiation curable resin binder is cured by exposure to ultraviolet rays or an electron beam.

When the ultraviolet rays are used, a super high pressure mercury lamp, a high pressure mercury lamp, a low pressure mercury lamp, a carbon arc, a metal halide lamp, or the like may be employed. The ultraviolet radiation preferably has energy of 50 to 300 kcal/mol and a wavelength in the range of 100 to 400 nm, more preferably 200 to 400 nm.

When an electron beam is used, a scanning type or curtain beam type electron beam accelerator may be employed. An electron beam with a wavelength of not more than 100 nm is projected with an accelerating voltage of 1000 keV or less, preferably 100 to 300 keV.

EXAMPLE

An example of the present invention will be explained hereinafter. "Parts" and "%" refer to those by weight unless otherwise specified.

Example 1

A coating solution for hard-coat layer having the composition shown in Table 1 was applied to one surface of a polyethylene terephthalate film 2 with a thickness of 188 gm (COSMOSHINE A 4300: Toyobo Co., Ltd.), and dried. The applied coating solution was then exposed to an ultraviolet ray using a high-pressure mercury lamp for 1 to 2 seconds to form a hard-coat layer 4 with a thickness of about 5 μm. A coating solution a for an easy adhesion layer having the composition shown in Table 1 was applied to the other surface, and then dried to form an easy adhesion layer 3 with a thickness of about 4 μm. Thus, an easy adhesion film for a transparent conductive thin film 1 of the present invention was obtained.

Comparative Examples 1–3

Coating solutions b–d for easy adhesion layer were used instead of the coating solution a used in Example 1 to form easy adhesion layers 3. Otherwise, easy adhesion films for a transparent conductive thin film were prepared in the same manner as in Example

TABLE 1

| Material | Coating solution for hard-coat layer (parts) | Coating solution for easy adhesion layer (parts) | | | |
|---|---|---|---|---|---|
| | | a | b | c | d |
| Binder A | 37.50 | 33.75 | 33.75 | 37.50 | — |
| Binder B | — | 7.50 | 7.50 | — | 37.50 |
| Particles C | — | 0.06 | — | 0.06 | 0.03 |
| Additive D | 0.80 | 0.80 | 0.80 | 0.08 | — |
| Toluene | 32.50 | 28.75 | 28.75 | 32.50 | 32.50 |
| Isopropanol | 18.00 | 18.00 | 18.00 | 18.00 | 18.00 |
| Ethylcellsolve | 12.00 | 12.00 | 12.00 | 12.00 | 12.00 |

An ionizing radiation curable resin (UNIDIC 17-806 (solid content 80%); Dainippon Ink and Chemicals, Inc.) was used as binder A, a (meth) acrylic acid copolymer (LMS-55 (solid content 40%); GOO CHEMICAL Co., Ltd.) was used as binder B, polymethyl methacrylate resin particles (MX-500 KS; Soken Chemical and Engineering Co., Ltd.) were used as particles C, and a photo-polymerization initiator (IRGACURE651; Ciba Specialty Chemicals) was used as additive D.

Transparency was evaluated for the thus obtained easy adhesion films for a transparent conductive thin film 1 in Example 1 and Comparative examples 1 to 3. In addition, transparent conductive films 6 were produced by forming an ITO film with a thickness of about 25 nm as a transparent conductive thin layer 5 on these easy adhesion layers 3 by sputtering. Then, adhesion between the easy adhesion layers 3 and the transparent conductive thin layer 5 was evaluated. The evaluation of transparency and adhesion was conducted as follows and the results are shown in Table 2.

[Transparency]

An SM color computer HGM-2 K (Suga Test Instruments) was used to measure haze values (%) for evaluation of the transparency (JIS-K 7105).

[Adhesion]

The crosscut adhesive tape method (JIS-K 5400) was used for evaluation. "○" in Table 2 indicates the case that the transparent conductive thin film 5 was not peeled from the easy adhesion layer 3. "X" indicates the case that the transparent conductive thin film 5 was peeled from the easy adhesion layer 3.

Next, a lower electrode board 7 was prepared by forming an ITO film with a thickness of about 30 nm on a glass substrate with a thickness of 1.1 mm by sputtering. Dot spacers 8 with a height of 5 μm and a diameter of 50 μm were formed on the lower electrode board at 1.0 mm intervals.

Then, touch panels having the structure shown in FIG. 1 were produced using the transparent conductive films 6 prepared using the easy adhesion films of Example 1 and Comparative examples 1 to 3 and the above-mentioned lower electrode board 7 with the dot spacers 8. (FIG. 1 shows only a part of the touch panel structure. The peripheral insulating layer, the lead circuit connected to the outside and so forth are omitted.)

The anti-Newton ring property of each of the thus obtained touch panel and the durability of the transparent conductive thin film 5 were evaluated as follows. The results are also shown in Table 2.

[Anti-Newton Ring Property]

Whether or not Newton ring occurred when the transparent conductive film 6 was pressed against the lower electrode board 7 was observed. "○" in Table 2 indicates the case that no Newton ring occurred between the transparent conductive film 6 and the lower electrode board 7. "Δ" indicates the case that Newton rings occurred. "X" indicates the case that Newton rings occurred and in addition the releasability of the transparent conductive film 6 from the lower electrode board 7 was poor.

[Durability]

Using a hitting durability tester having a rubber end with Shore hardness of 60, the transparent conductive thin films 5 were observed after 100,000 hits with a load of 300 g and a hitting cycle of 10,000 per hour. "○" in Table 2 indicates the case that no abnormality was observed in the transparent conductive thin film 5. "X" indicates the case that the transparent conductive thin film 5 was abraded.

TABLE 2

| | Example 1 | Comparative example 1 | Comparative example 2 | Comparative example 3 |
|---|---|---|---|---|
| Transparency (haze value) | 0.8 | 0.7 | 0.8 | 2.0 |
| Adhesion | ○ | ○ | X | ○ |
| Anti-Newton ring property | ○ | X | ○ | Δ |
| Durability | ○ | ○ | X | X |

It is apparent from the results shown in Table 2 that the easy adhesion film for a transparent conductive thin film 1 of Example 1 was excellent in transparency, adhesion, anti-Newton ring property and durability.

On the other hand, the easy adhesion film for a transparent conductive thin film of Comparative example 1 could not achieve anti-Newton ring property because the easy adhesion layer 3 did not contain polymethyl methacrylate resin particles. The easy adhesion film for a transparent conductive thin film of Comparative example 2 showed low adhesion and no durability of the transparent conductive thin film 5 because the easy adhesion layer 3 did not contain a (meth)acrylate copolymer binder.

The easy adhesion film for a transparent conductive thin film of Comparative example 3 showed insufficient anti-Newton ring property because the easy adhesion layer 3 did not contain an ionizing radiation curable resin binder, which would impart anti-Newton ring property to the layer 3 by providing unique corrugated irregularities when mixed with particles. In addition, since this easy adhesion layer 3 had low abrasion resistance, the transparent conductive thin film 5 could not achieve sufficient durability.

What is claimed is:

1. An easy adhesion film for a transparent conductive thin film comprising a transparent polymer film and an easy adhesion layer formed on the transparent polymer film, wherein the easy adhesion layer comprises at least a photopolymerizable prepolymer curable by ionizing radiation, a (meth)acrylate copolymer binder and polymethyl methacrylate resin particles.

2. The easy adhesion film for a transparent conductive thin film according to claim 1, wherein the photopolymerizable prepolymer is included in an amount of 70 to 97% by weight of total amount of all of binders constituting the easy adhesion layer.

3. An easy adhesion film for a transparent conductive thin film comprising a transparent polymer film and an easy adhesion layer formed on the transparent polymer film, wherein the easy adhesion layer comprises at least an ionizing radiation curable resin binder, a (meth)acrylate copolymer binder and polymethyl methacrylate resin particles, wherein the (meth)acrylate copolymer binder is included in an amount of 3 to 30% by weight of total amount of all of binders constituting the easy adhesion layer.

4. An easy adhesion film for a transparent conductive thin film comprising a transparent polymer film and an easy adhesion layer formed on the transparent polymer film, wherein the easy adhesion layer comprises at least an ionizing radiation curable resin binder, a (meth)acrylate copolymer binder and polymethyl methacrylate resin particles, wherein the polymethyl methacrylate resin particles are included in an amount of 0.01 to 0.5% by weight of total amount of all of binders constituting the easy adhesion layer.

5. The easy adhesion film of claim 3 wherein said ionizing radiation curable resin binder is a photopolymerizable prepolymer.

6. The easy adhesion film of claim 4 wherein said ionizing radiation curable resin binder is a photopolymerizable prepolymer.

7. The easy adhesion film according to claim 1 wherein said photopolymerizable prepolymer is an acrylic prepolymer having at least two acrylolyl groups per molecule and providing a three-dimensional network structure when cross-linked and cured.

8. The easy adhesion film according to claim 2 wherein said photopolymerizable prepolymer is an acrylic prepolymer having at least two acrylolyl groups per molecule and providing a three-dimensional network structure when cross-linked and cured.

9. The easy adhesion film according to claim 5 wherein said photopolymerizable prepolymer is an acrylic prepolymer having at least two acrylolyl groups per molecule and providing a three-dimensional network structure when cross-linked and cured.

10. The easy adhesion film according to claim 6 wherein said photopolymerizable prepolymer is an acrylic prepolymer having at least two acrylolyl groups per molecule and providing a three-dimensional network structure when cross-linked and cured.

11. The easy adhesion film according to claim 1 wherein said photopolymerizable prepolymer is an acrylic prepolymer selected from the group consisting of urethane acrylate, polyester acrylate, epoxy acrylate and melamine acrylate.

12. The easy adhesion film according to claim 2 wherein said photopolymerizable prepolymer is an acrylic prepolymer selected from the group consisting of urethane acrylate, polyester acrylate, epoxy acrylate and melamine acrylate.

13. The easy adhesion film according to claim 5 wherein said photopolymerizable prepolymer is an acrylic prepolymer selected from the group consisting of urethane acrylate, polyester acrylate, epoxy acrylate and melamine acrylate.

14. The easy adhesion film according to claim 6 wherein said photopolymerizable prepolymer is an acrylic prepolymer selected from the group consisting of urethane acrylate, polyester acrylate, epoxy acrylate and melamine acrylate.

* * * * *

UNITED STATES PATENT AND TRADEMARK OFFICE
CERTIFICATE OF CORRECTION

PATENT NO.    : 6,413,629 B1
DATED         : July 2, 2002
INVENTOR(S)   : Kimura It is certified that error appears in the above-identified patent and that said Letters Patent is hereby corrected as shown below:

<u>Column 4,</u>
Line 48, "gm" should read -- $\mu$m --; and
Line 67, after "Example" insert -- 1. --.

Signed and Sealed this

Twenty-sixth Day of November, 2002

*Attest:*

JAMES E. ROGAN
*Attesting Officer*  *Director of the United States Patent and Trademark Office*